C. S. BULKLEY.
TELEGRAPH REPEATER.
No. 7,769. Patented Nov. 12, 1850.
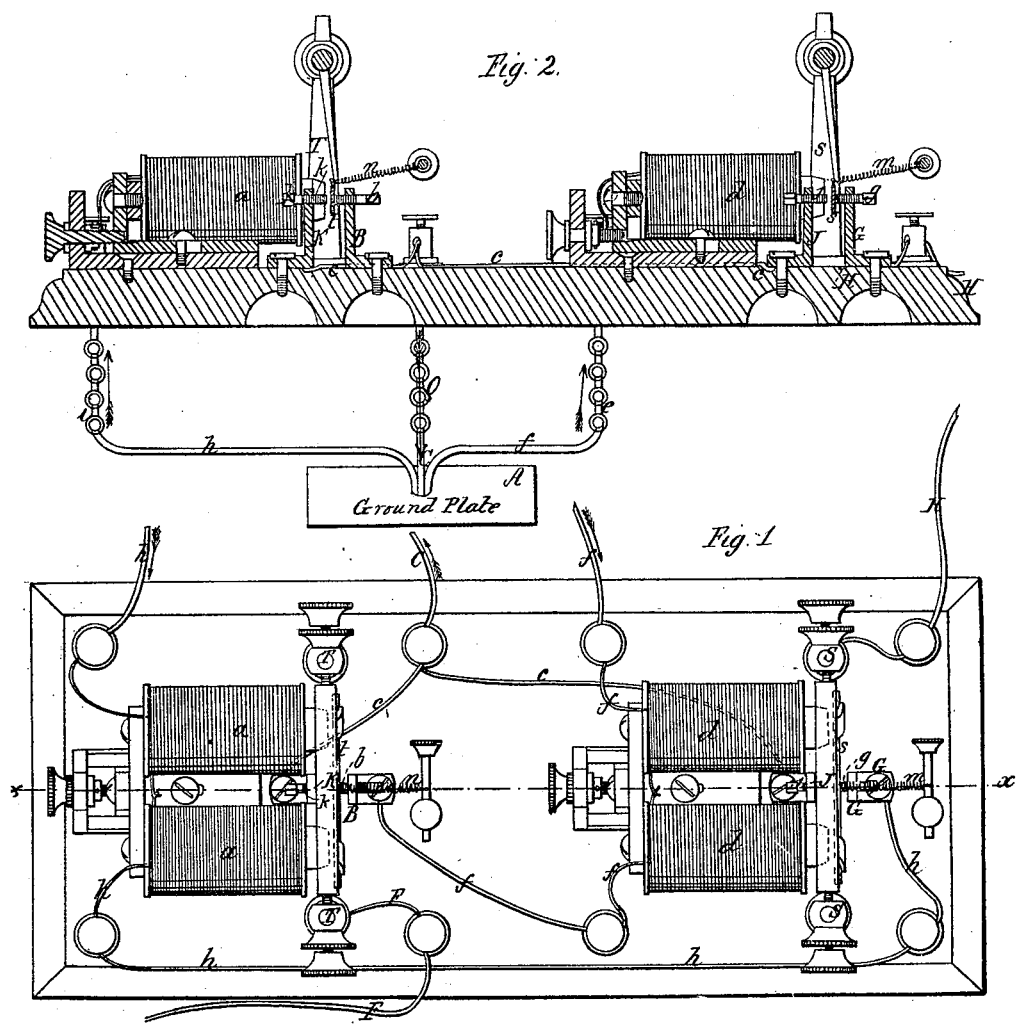

UNITED STATES PATENT OFFICE.

CHAS. S. BULKLEY, OF MACON, GEORGIA.

IMPROVEMENT IN REPEATERS FOR ELECTRO-MAGNETIC TELEGRAPHS.

Specification forming part of Letters Patent No. 7,769, dated November 12, 1850; antedated September 10, 1850,

*To all whom it may concern:*

Be it known that I, CHARLES S. BULKLEY, of Macon, in the county of Bibb, in the State of Georgia, have invented a Double-Acting Telegraphic Repeater; and I do hereby declare that the following is a full and exact description thereof, reference being had to the accompanying drawings, making a part of this specification—

Figure 1 being a top view, and Fig. 2, a vertical longitudinal section in the line $x$ $x$ of Fig. 1.

I construct my double-acting telegraphic repeater by placing two electro-magnets, $a$ $a$ and $d$ $d$, near each other in the same office, and respectively connecting the said electro-magnects with the wires F H of two main circuits coming from different directions, in such a manner that the main-circuit wire F will be in connection with the armature $t$ of the electro-magnet $a$ $a$, and thence be continued by the wire $f$, through the helices of the electro-magnet $d$ $d$, to the ground-plate A, and the opposite main-circuit wire, H, be in connection with the armature $s$ of the electro-magnet $d$ $d$, and thence be continued, by the wire $h$, through the helices of the electro-magnet $a$ $a$, to the ground-plate A, and then connecting the ground-plate A and a galvanic battery, O, with a couple of points, $j$ $k$, placed in such positions in relation to the armatures $s$ $t$ of the said electro-magnets $a$ $a$ and $d$ $d$ that when a galvanic current is sent over either one of the said main circuits that are in connection with the telegraphic repeater, it will, by charging the electro-magnet that it embraces in the repeater, attract its armature against one of the points $j$ or $k$, and thereby throw the opposite main circuit that is connected with the said armature into connection with the ground-plate A and the galvanic battery O, which connection will cause this said opposite main galvanic circuit to operate another telegraphic repeater at the next station, and, if necessary, a registering-instrument in connection therewith.

The points $j$ $k$ are supported by their respective standards J K in near proximity to the armatures $s$ $t$, and on the opposite sides of the armatures from these points $j$ $k$ the points $b$ $g$ are placed, which are supported by their respective standards B G. The aforesaid armatures $s$ $t$ of the electro-magnets $d$ $d$ and $a$ $a$ respectively descend between the pairs of points $j$ $g$ and $k$ $b$ and are connected to pendulous arms descending from axles that are respectively pivoted between the pairs of supporting-standards S S and T T.

Springs $m$ $n$ keep the armatures $s$ $t$ securely against the respective points $g$ $b$, save when they are acted upon by their electro-magnets.

The main-circuit wire H is connected to the base of one of the standards S, which standard, with the pivoted axle and its pendulous arms in connection therewith, serves to continue the circuit from the wire H to the armature $s$, whence it is continued by the point $g$, the standard G, and the wire $h$ through the helix of the electro-magnet $a$ $a$ to the ground-plate A.

The main-circuit wire F is connected to the base of one of the standards T, whence the circuit is continued by the said standard, the axle, and pendulous arms and the armature $t$, the point $b$, standard B, and wire $f$, through the helix of the electro-magnet $d$ $d$, to the ground-plate A. A wire, C, passes from the ground-plate A through the galvanic battery O, and is connected by the branch wires $c$ $c$ with the two points $j$ $k$.

It will now be perceived that, by closing at a distant station the poles of the main galvanic circuit formed in part by the wire H and operated by a battery at the distant station, the charging thereby of the electro-magnet $a$ $a$ will attract the armature $t$ thereof against the point $k$, which armature $t$, being in connection with the wire F, and the point $k$ in connection with the battery O and ground-plate A, serve as the poles of the main galvanic circuit composed in part by the wire F, and, consequently, by closing these poles, as above stated, an electro-magnet, $a$ $a$, in this second main galvanic circuit and located in a repeater at another station will be charged from the galvanic battery O, and, consequently, by means of its armature, will close the poles of another galvanic circuit, and so on *ad infinitum*.

When at a distant station the poles are closed of the main galvanic circuit composed in part of the wire F, and operated by another battery at the distant station, the charging thereby of the electro-magnet $d$ $d$ in this circuit and in my telegraphic repeater will attract the armature s of the said electro-magnet against the point j, which will close the poles of the galvanic circuit composed in part of the wire H, and thereby send a current of galvanism from the battery O over this circuit to an electro-magnet, d d, in the same circuit and in a repeater at the next station, which, in its turn, will, through its armature, close the poles of another galvanic circuit, and so on to any extent.

In the foregoing portion of this specification I have described but one battery, O, as connected with my telegraphic repeater, and in such a manner that it can be thrown into either one of the main galvanic circuits, in connection with the said repeater, by closing the poles of the opposite galvanic circuit in connection with the same; but I have discovered that it is better to divide the battery O into three batteries, viz., O e i, and arrange them in the following manner, to wit: the battery O having its positive-pole connected with a ground-plate and its negative-pole connected to the points j k, in the manner before described; the battery e placed in the galvanic circuit with the electro-magnet d d, and having its negative-pole connected to the ground-plate, and the battery i placed in the circuit with the electro-magnet a a, also having its negative-pole connected with the ground-plate. With this arrangement of galvanic batteries it will be perceived that when the armature t is made to strike against the point k in a telegraphic repeater to throw the battery O (connected with the said point) into the main circuit, formed principally by the wire F, the battery i in the opposite end of this circuit (to the left) will act in harmony with the said battery O, and thereby more powerfully charge the electro-magnet a a in the telegraphic repeater at the next repeating-station embraced in this circuit than the single battery O would do were its capacity increased by the addition thereto of the said battery i. When the armature t falls back against the point b, the battery e and electro-magnet d d, in connection with a telegraphic repeater at a station, will, by the wires f F, be thrown into the same circuit with the electro-magnet a a and the battery i connected with another telegraphic repeater at the next station to the left, but with the poles of the said batteries in opposition to each other, which antagonistic position of the poles of the said batteries will more effectually prevent the passage of the galvanic currents over the circuit than by breaking the circuit in the usual manner. When the armature s is made to strike against a point, j, in a telegraphic repeater to throw the battery O (in connection with the said point) into the main circuit formed principally by the wire H, the battery e in the opposite end of this circuit will act in harmony with the said battery O, and thereby more powerfully charge the electro-magnet d d in the telegraphic repeater at the next repeating-station to the right embraced in this said circuit than the single battery O could do were its capacity increased by the addition thereto of the said battery e. When the armature s falls back against the point g, the battery i and electro-magnet a a, in connection with the telegraphic repeater at one station, will, by the wires h H, be thrown into the same circuit with the electro-magnet d d, and the battery e connected with another repeater at the next station to the right, but with the poles of the said batteries e i in opposition to each other, for the purpose as above set forth.

The wire F, which is represented in the drawings as passing to the left from my double-acting telegraph-repeater, is connected to another similar instrument at another station in the same manner that the wire H is represented as being connected with the instrument shown in the drawings, and the wire H, which is represented in the drawings as passing to the right from my double-acting telegraphic repeater, is connected to another similar instrument at another station in the same manner that the wire F is represented as being connected with the instrument shown in the drawings.

Local galvanic circuits for registering or writing may be combined with the electro-magnets of my double-acting telegraphic repeater.

Having thus fully described my double-acting telegraphic repeater, what I claim therein as my invention, and desire to secure by Letters Patent, is—

1. The manner of connecting two galvanic circuits with the two electro-magnets a a and d d in the said repeater, substantially as herein represented and described—to wit, each of the said galvanic circuits as it passes through my said telegraphic repeater embracing in its course the armature of the opposite electro-magnet in the said instrument previous to its passage through the helices in the electro-magnet embraced in its own respective circuit.

2. In combination with the above, the connecting the points b j with the galvanic battery O (or batteries) when the said points are placed in such positions in relation to the armatures s t of the electro-magnets in my said telegraphic repeater that when either one of the said electro-magnets is charged it will, by attracting its armature against one of the points b or j, close the poles of the galvanic circuit in which the opposite electro-magnet in the instrument is in connection, and thereby throw the battery O into the said circuit, substantially as herein set forth.

The above specification of my double-acting telegraphic repeater signed this 23d day of August, 1850.

CHAS. S. BULKLEY.

Witnesses:
Z. C. ROBBINS,
GEO. WOOD.